United States Patent
Björnemo et al.

(10) Patent No.: US 10,042,073 B2
(45) Date of Patent: Aug. 7, 2018

(54) ELECTRICALLY ISOLATED STREAMER SECTION

(71) Applicant: PGS GEOPHYSICAL AS, Oslo (NO)

(72) Inventors: Lars Erik Magnus Björnemo, Kista (SE); Ulf Peter Lindqvist, Kista (SE)

(73) Assignee: PGS Geophysical AS, Oslo (NO)

( * ) Notice: Subject to any disclaimer, the term of this patent is extended or adjusted under 35 U.S.C. 154(b) by 432 days.

(21) Appl. No.: 14/594,389

(22) Filed: Jan. 12, 2015

(65) Prior Publication Data

US 2016/0109609 A1    Apr. 21, 2016

Related U.S. Application Data

(60) Provisional application No. 62/065,368, filed on Oct. 17, 2014.

(51) Int. Cl.
*G01V 3/165* (2006.01)
*G01V 3/02* (2006.01)
*G01V 3/08* (2006.01)

(52) U.S. Cl.
CPC ............. *G01V 3/165* (2013.01); *G01V 3/02* (2013.01); *G01V 3/083* (2013.01)

(58) Field of Classification Search
None
See application file for complete search history.

(56) References Cited

U.S. PATENT DOCUMENTS

| 2,838,731 A | 6/1958 | Cruzan et al. |
| 3,182,250 A | 5/1965 | Mayes |
| 4,298,840 A | 11/1981 | Bischoff et al. |
| 6,674,286 B2 | 1/2004 | Lagmanson |
| 8,816,690 B2 * | 8/2014 | Sudow .................. G01V 1/201 324/347 |
| 9,176,254 B2 * | 11/2015 | Johnstad ................ G01V 1/201 |
| 2009/0001987 A1 | 1/2009 | Davidsson |
| 2009/0315539 A1 * | 12/2009 | Helwig .................. G01V 3/083 324/149 |

(Continued)

FOREIGN PATENT DOCUMENTS

| GB | 2489780 A | * 10/2012 | ............. G01V 1/201 |
| GB | 2489781 A | * 10/2012 | ............ G01V 1/3808 |

OTHER PUBLICATIONS

European Search Report for Application No. 15188220.6 dated Feb. 24, 2016; 9 total pages.

*Primary Examiner* — Jermele M Hollington
(74) *Attorney, Agent, or Firm* — Patterson & Sheridan, LLP

(57) ABSTRACT

Aspects described herein provide for a sensor assembly having an electrically isolated cable segment that may be used for geophysical prospecting. The sensor assembly generally includes a first cable segment comprising at least one electromagnetic (EM) sensor, and a second cable segment connected to the first cable segment and electrically isolated from the first cable segment. The second cable segment may be free of electrically conductive components. Alternatively, the second cable segment may have electrically conductive components that are not electrically connected to the first cable segment. The electrically isolated cable segment may reduce or eliminate undesired signal cross-feed from the EM source to the first cable segment, which may aid in maintaining data quality.

19 Claims, 5 Drawing Sheets

(56) References Cited

U.S. PATENT DOCUMENTS

| | | | |
|---|---|---|---|
| 2010/0271032 A1* | 10/2010 | Helwig | G01V 3/083 |
| | | | 324/365 |
| 2011/0292759 A1 | 12/2011 | Südow et al. | |
| 2012/0250457 A1 | 10/2012 | Rickert, Jr. et al. | |
| 2013/0162256 A1 | 6/2013 | Hobbs | |
| 2014/0167768 A1* | 6/2014 | Linfoot | G01V 3/15 |
| | | | 324/365 |
| 2016/0238735 A1* | 8/2016 | Bjornemo | G01V 3/083 |
| 2017/0116357 A1* | 4/2017 | Bjornemo | G06F 17/5009 |
| 2017/0160412 A1* | 6/2017 | Rickert, Jr. | G01V 1/22 |

* cited by examiner

ELECTRICALLY ISOLATED STREAMER SECTION

CROSS-REFERENCE TO RELATED APPLICATIONS

This application claims benefit of U.S. Provisional Patent Application Ser. No. 62/065,368, filed Oct. 20, 2014, entitled "Electromagnetic Field Isolated Streamer Section", which is incorporated herein by reference.

BACKGROUND

Certain aspects of the present disclosure generally relate to the field of marine geophysical processing and may have particular applicability to electromagnetic (EM) surveying.

In geophysical prospecting in a marine environment, cable configurations are often towed behind a vessel to deploy equipment such as energy sources and sensors. Energy sources may include EM field sources that generate EM fields that may be helpful in identifying geophysical features. Wires or cables for generating such signals may be bundled into source cables (also called "sources") that are commonly jacketed or wrapped in an enclosure. Other geophysical energy sources may include air guns, marine vibrators, electric bipole antennae, and magnetic coils. The geophysical energy sources may be positioned at known locations in a geographic area. In a marine setting, the sources may be towed behind one or more boats traveling a prescribed course, usually in a group of aligned paths.

Measurements may be taken of wavefields that have been initiated by the geophysical energy sources, for example by sensors located in a sensor assembly such as a towed receiver streamer. The data set obtained typically contains information of interest indicating the geology of earth strata below the geophysical equipment.

EM surveying systems have used different methods to attach EM sensors (e.g., electrodes) to surveying equipment. For example, some systems embed EM sensors into a body of a sensor assembly cable segment or other cable assembly. Towed EM streamers (cables containing EM sensors and possibly other sensors, such as seismic sensors), can be used to measure EM fields. The measured EM fields can be generated by an EM field source (electrode), which can be a controlled source EM (CSEM). Variations in natural EM fields can also be measured. The EM field source is actuated at selected times, and measurements made by the various sensors on the streamer are detected and recorded for processing to determine marine subsurface properties, such as to locate subsurface resistivity anomalies in the rock formations below the water bottom and to quantify the content of materials, such as petroleum, that may be associated with such anomalies.

In some instances, the EM field source can be towed from a survey vessel that tows a number of streamers. EM fields generated by the EM field source and/or the survey vessel can affect conductive wires in the streamers that are between the survey vessel and the EM sensors (e.g., electrodes). The EM fields can generate disturbances (interference) that travel along the conductive wires, which can contaminate the EM field detections and/or measurements by the streamer's EM sensors. Unintended detection of the EM field may introduce noise into data obtained from the sensors. This may lead to less accurate data and additional processing in order to account for noise attributed to the unintentional detection.

Therefore, techniques and apparatus for geophysical surveying that reduce or eliminate unintended transmission of interference from the source's EM field are desirable.

BRIEF DESCRIPTION OF THE DRAWINGS

So that the manner in which the features of the present disclosure can be understood in detail, a description of the disclosure may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
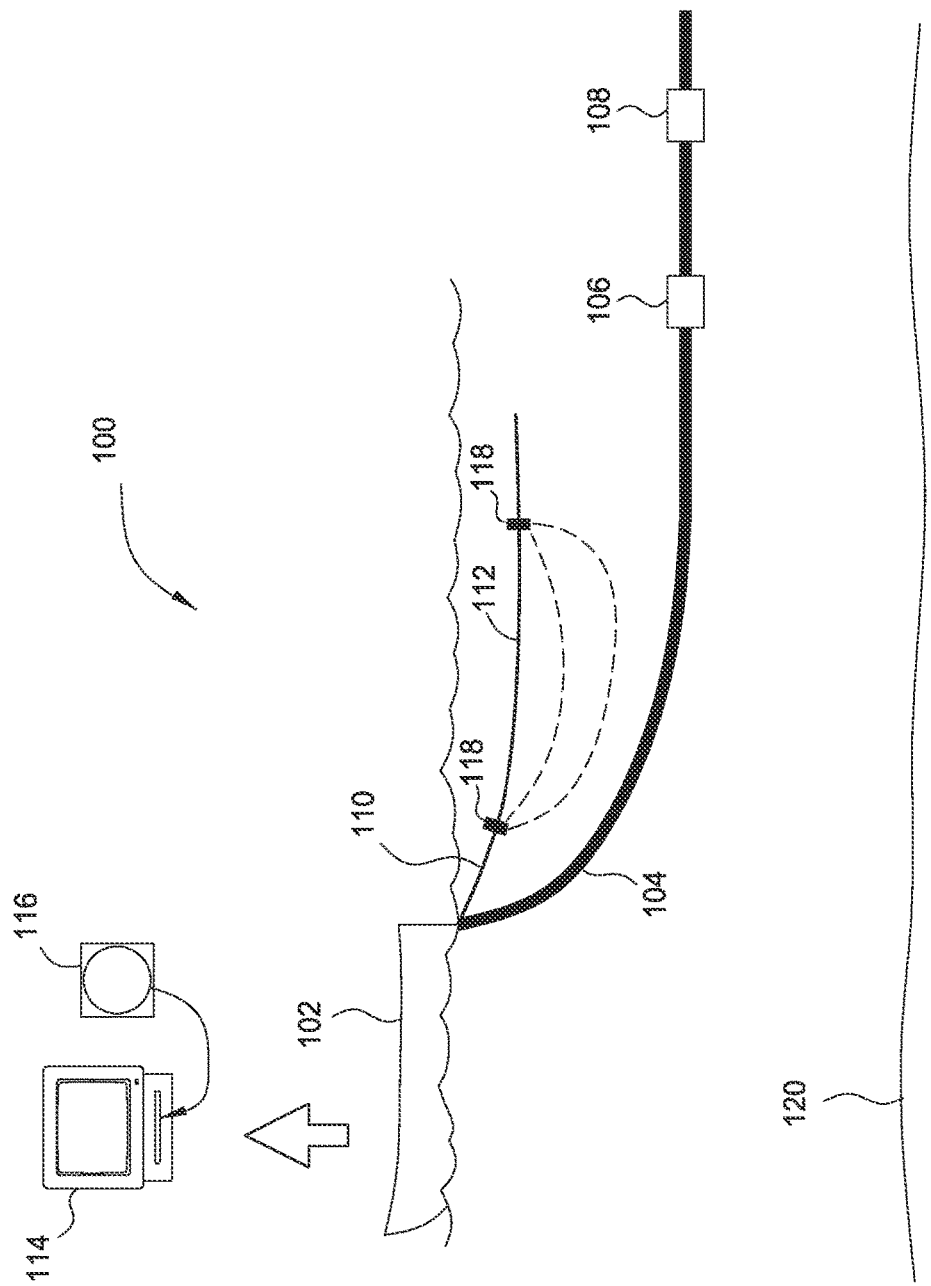
FIG. 1 is an example activity diagram showing a data acquisition scheme in a marine context having a prior art towing configuration in a marine context that illustrates unintended detection of an electromagnetic (EM) field by a sensor assembly.

It is to be understood the present disclosure is not limited to particular devices or methods, which may, of course, vary. It is also to be understood that the terminology used herein is for the purpose of describing particular aspects only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." Terms such as "coupled", "coupling", and "couplable" refer to being directly or indirectly connected.

This disclosure may have applications in marine surveying, in which one or more energy sources are used to generate wavefields, and sensors—either towed or ocean bottom—receive energy generated by the sources and affected by the interaction with the subsurface formation. Likewise, this disclosure may have applications in marine electromagnetic (EM) surveying, in which one or more EM field sources are used to generate EM fields, and EM sensors—either towed or ocean bottom—receive EM energy generated by the EM sources and affected by the interaction with the subsurface formations.

The present disclosure describes various aspects for electrically isolating a cable segment of a sensor assembly from another cable segment of the sensor assembly to reduce a possibility of transferring EM disturbances from a cable segment that picks up unintended detection of the EM field to a cable segment having sensors. According to certain aspects, unintended transmission of interference from the source's EM field by conductors in the sensor assembly may be avoided or reduced by reducing, or preventing, electrically conductive wires and/or components in a cable segment of the sensor assembly that is expected to be affected by unintended EM field pickup. In this way, that cable segment can be electrically isolated from another cable segment of the sensor assembly having sensors such as EM sensors. Seismic sensors also can benefit by being electrically isolated from conductors that pick up the EM field from the EM field source.

As would be understood by one of ordinary skill in the art with the benefit of this disclosure, aspects and advantages described herein with reference to a "streamer" might be equally achievable and advantageous when used with a marine ocean bottom sensor cable. Consequently, as used herein, "streamer" should be read to refer equally to a towed sensor assembly as well as to an ocean bottom sensor assembly.

Aspects of the present disclosure provide an apparatus for marine geophysical surveying. The apparatus may include a first cable segment comprising at least one EM sensor and a second cable segment connected to the first cable segment and electrically isolated from the first cable segment.

Aspects of the present disclosure provide a method for performing a marine geophysical survey. The method may include providing an EM field source cable disposed in a body of water, wherein the EM field source cable comprises an EM field source that generates an EM field, providing a sensor assembly disposed in the body of water, wherein the sensor assembly comprises a first cable segment having at least one EM sensor and a second cable segment connected to the first cable segment and electrically isolated from the first cable segment, and measuring the EM field with the at least one EM sensor.

Aspects of the present disclosure provide a marine geophysical surveying system. The system may include an EM field source cable coupled to a vessel, wherein the EM field source cable comprises an EM field source that generates an EM field, a sensor assembly coupled to the vessel, wherein the sensor assembly comprises a first cable segment comprising at least one EM sensor and a second cable segment connected to the first cable segment and electrically isolated from the first cable segment.

Aspects of the present disclosure provide an apparatus for marine geophysical surveying. The apparatus may include an aft sensor assembly cable segment comprising at least one EM sensor, a front sensor assembly cable segment couplable to surveying equipment of a survey vessel and connected to the aft sensor assembly cable segment, wherein the front sensor assembly cable section does not have electrically conductive wires or components and has a reduced capacity to couple to the EM field relative to the aft sensor assembly cable segment.

FIG. 1 is an example activity diagram showing a data acquisition scheme in a marine context showing a prior art towing configuration 100 that illustrates unintended detection of an EM field by a sensor assembly (e.g., a towed streamer). The towing configuration 100 is an arrangement typically used for geophysical prospecting in a marine environment. A vessel 102 tows a sensor assembly 104 in the water behind the vessel 102. The sensor assembly 104 includes EM sensors 106, 108. In a typical marine data acquisition situation, the vessel 102 may have any suitable number of sensor assemblies, each with multiple sensors. One typical marine EM sensor assembly includes a plurality of spaced apart pairs of electrodes, each pair coupled across the input terminals to a proximately positioned signal amplifier. The sensor assembly may also include signal digitization and electrical to optical signal conversion devices (not shown separately in FIG. 1) so that voltage measurement signal transmission over the sometimes very long distance (up to several kilometers) will not itself induce substantial voltages in the signal lines connecting the measurement electrodes to the respective voltage measuring circuitry.

The vessel 102 also tows an energy source 112, which may be attached directly to, mounted on, or attached by extension to the vessel 102 (not shown), for example by any suitable extension 110 (as shown in FIG. 1), or attached to or displaced from another vessel (not shown). The energy source 112 of FIG. 1 emits EM energy. The energy source may be a source cable that includes electrodes 118 disposed at spaced apart positions along the source cable. The electrodes 118 may be energized at selected times by an electrical current source (not shown separately) to induce an EM field in the formations below the water bottom 120. The current may be alternating current or switched direct current (e.g., switching current on, switching current off, reversing current polarity, or sequential switching such as a pseudo-random binary sequence). The configuration shown in FIG. 1 may induce a horizontal dipole electric field in the subsurface when the electrodes 118 are energized by electric current. It is entirely within the scope of the present disclosure to induce vertical dipole electric fields in the subsurface, as well as to induce vertical and/or horizontal dipole magnetic fields in the subsurface. Inducing magnetic fields may be performed by passing electrical current through a loop antenna or solenoid coil. Accordingly, the direction of and the type of field induced is not intended to limit the scope of the disclosure. Further, the disclosure may be applicable to use with any type of EM source signal.

In the marine context, the energy may propagate through the water and may interact with various surfaces of water and geologic features. The sensors 106, 108 may detect the resultant wavefield. The physical data collected from the sensors 106, 108 depicting real-world signals and vibrations from the physical environment, forms a primary record of the wavefield that may be represented and stored in a computer 114 or on a computer readable medium 116 that may be inserted into the computer 114 for storing the data. The computer readable medium 116, which is not a transitory signal medium, may contain the raw data collected from the sensors 106/108, or a data product made by processing the raw data. Computer readable media that may store various aspects include rotationally operated magnetoresistive memory devices such as floppy disks, hard disks, stationary magnetoresistive memory devices such as flash drives, and optical disks.

In the example prior art towing configuration 100 illustrated in FIG. 1, the entire length of the sensor assembly 104, including the portions of the sensor assembly 104 that are located in the emission field of the energy source 112, is conductive, which is shown in FIG. 1 by depicting the sensor assembly 104 as a thick, dark line. The electrically conductive wires pass through sensor assembly 104 from the vessel 102 all the way through the sensor assembly 104 to the farthest aft section of the sensor assembly 104, which may include a section where the EM sensors 106, 108 are located. Proximity of conductors in the sensor assembly 104 to the EM fields emitted by the EM field source can contribute to the unintended transmission of interference from the source's EM field by the conductors.

FIG. 1 illustrates one example of a towing configuration that may result in transmission of interference from the source's EM field by conductors in the sensor assembly, but there are other configurations that can also experience unintended pickup. For instance, a sensor assembly could be attached as a tail on the farthest aft EM field source and still have conductive wires in a near field of the EM field source. The present disclosure presents various aspects intended to reduce the possibility for unintended transmission of interference from the source's EM field by conductors in the sensor assembly.

Figure 2:
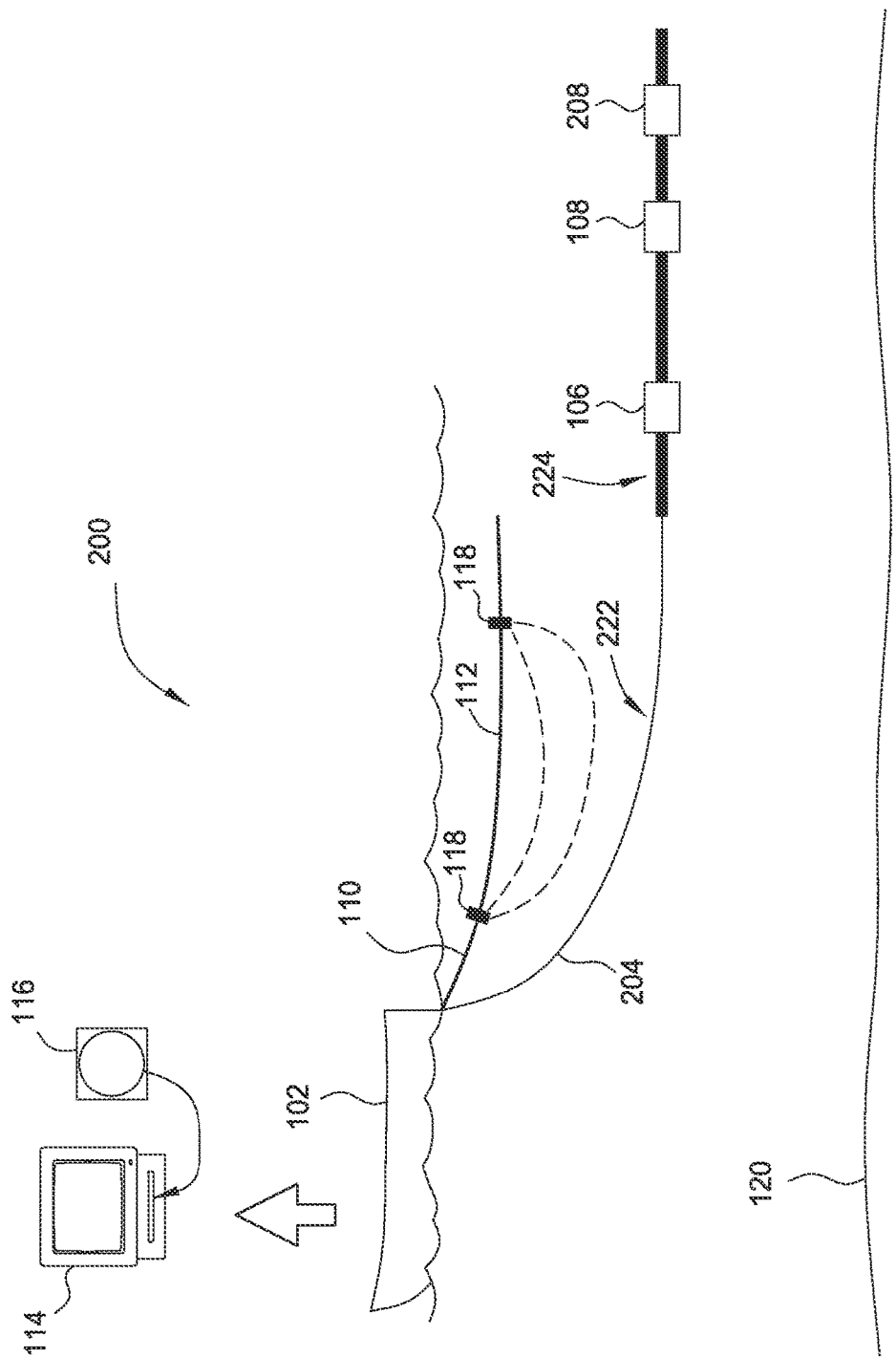
FIG. 2 is an example activity diagram showing a data acquisition scheme in a marine context having a towing configuration with an electrically isolated sensor assembly portion, according to certain aspects of the present disclosure.

FIG. 2 is an example activity diagram showing a towing configuration 200 in a marine context that reduces or eliminates unintended transmission of interference from the source's EM field by conductors in the sensor assembly, according to certain aspects of the present disclosure. The towing configuration 200 may include vessel 102 that tows the energy source 112. In the example illustrated in FIG. 2, the EM field source 112 is displaced from the vessel 102 by a suitable extension 110. However, although not depicted in FIG. 2, according to certain aspects, the energy source 112 could also be attached directly to, mounted on, or attached via extension to the vessel 102 or towed from, attached directly to, mounted on, or attached via extension to another vessel.

Vessel 102 may also tow a sensor assembly 204 in the water behind the vessel 102. According to certain aspects, the sensor assembly 204 may have a first cable segment 224 having EM sensors 106, 108. According to certain aspects, the first cable segment 224 may have any number of EM sensors. Additionally, the first cable segment 224 may have other types of sensors, such as seismic sensors. For example, the sensor assembly 204 may also include sensor 208 which may be seismic sensor. The sensors 106, 108 may detect the resultant wavefield. The first cable segment 224 may be conductive, as shown by the dark line. For example, the first cable segment 224 may include electrically conductive wires and/or electrical components.

According to certain aspects, the sensor assembly 204 may also include a second cable segment 222. According to certain aspects, the second cable segment 222 may be electrically isolated from the first cable segment 224, as shown by the light line.

According to certain aspects, the second cable segment 222 may be electrically isolated from the first cable segment 224 by having reduced electrically conductive wires and/or electrical components, or by having no electrically conductive wires and/or electrical components, for the entire length of the second cable segment 222. According to certain aspects, the second cable segment 222 may include a length of the sensor assembly 204 that extends within the range of the EM wavefield emitted from the energy source 112. Thus, the second cable segment 222 has reduced or no capacity to couple to the EM field and conduct interfering signal to the EM sensors 106, 108.

Figure 3:
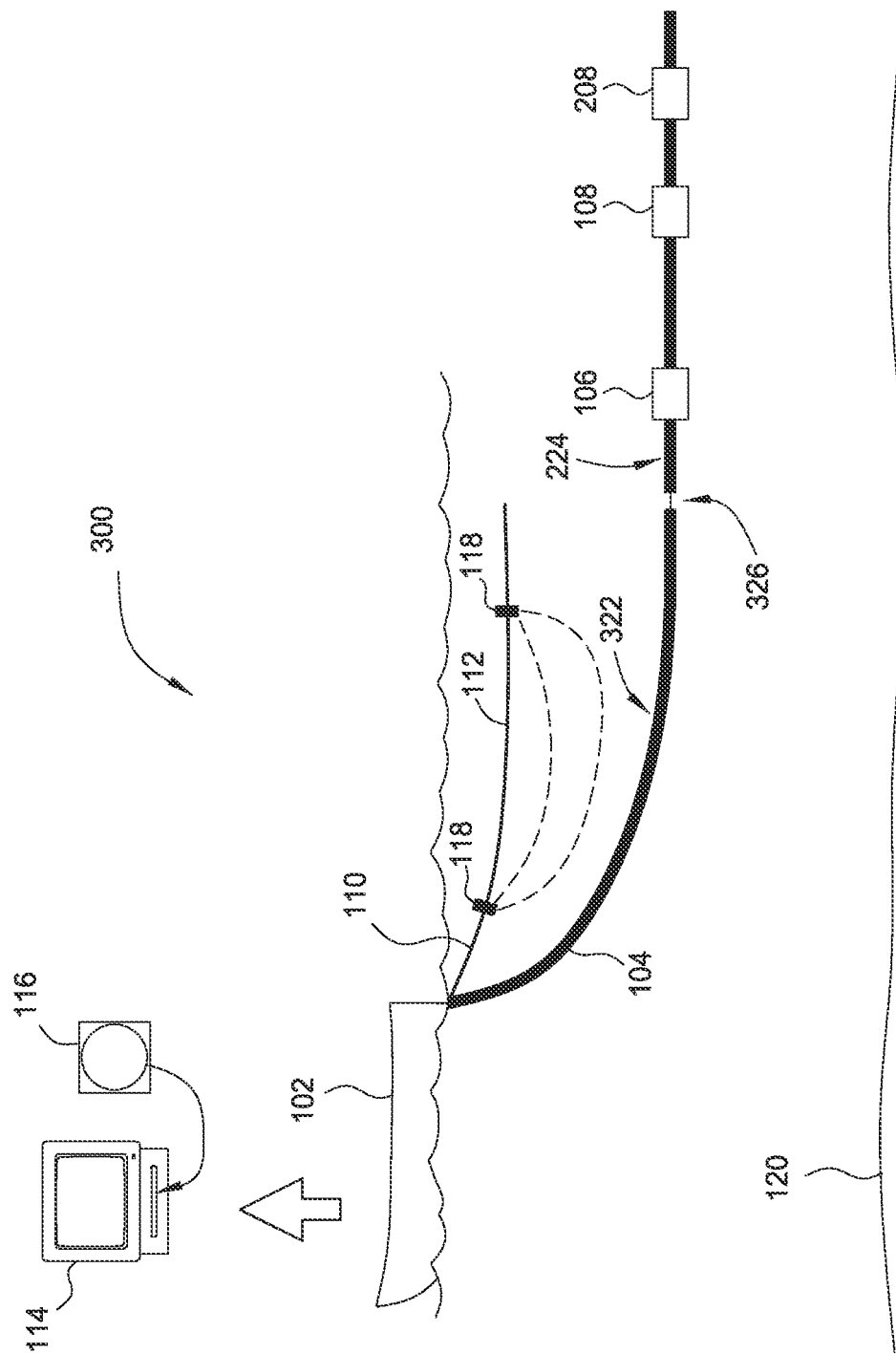
FIG. 3 is an example activity diagram showing a data acquisition scheme in a marine context having a towing configuration with an electrically isolated sensor assembly portion, according to certain aspects of the present disclosure.

Alternatively, the second cable segment 222 may include electrically conductive wires and/or components, but the electrically conductive wires and/or components do not couple electrically with the first cable segment 224. FIG. 3 is an example diagram showing a towing configuration 300 in a marine context that reduces or eliminates unintended detection of an EM field by a cable, according to certain aspects of the present disclosure. As shown in FIG. 3, the second cable segment 322 may include electrically conductive wires and/or components through the length of the second cable segment 322. The second cable segment may also include at least one electrically isolated portion 326 free of any electrically conductive wires or components such that the second cable segment 322 does not electrically couple with the first cable segment 224. In this case, although the second cable segment 322 may pickup unintentional detection of the EM field, the interference is not passed to the first cable segment 224 and does not affect measurements by the sensors 106, 108. Such configurations may be useful in cases where conductive materials may be used in the second cable segment 322 as ballast or strength members. If the second cable segment 322 contains no conductors (as shown in FIG. 2), the bulk density of the second cable segment 322 may be substantially different from that of the first cable segment 224, if the first cable segment 224 contains a substantial mass of conductors. To equalize the bulk density of the first and second cable segments, conductors may be added to the second cable segment 322 without electrically coupling to the first cable segment 224. In this way, the bulk density of the second cable segment 322 can be controlled without transmitting interference from the EM fields to the first cable segment 224.

A length for the second cable segment 322 of around one kilometer may be effective in some implementations, although the effective length of the second cable segment 322 may depend on a particular application, such as the energy source 112 length and/or position. In some cases, the length of the sensor assembly 204 may be several kilometers. The second cable segment 322 may be positioned proximate to the EM field source, for example, within the power zone of the EM fields emitted by the EM field source, or within an area where unintended detection of the EM field may be expected. According to certain aspects, the length of the second cable segment 322 may be equal to the length of the energy source 112. Alternatively, the length of the second cable segment 322 may be shorter or longer than the energy source 112. In the case of an electrically isolated portion 326, the electrically isolated portion 326 may be any size. For example, the electrically isolated portion 326 may be created by clipping electrically conductive wires between the first cable segment 224 and the second cable segment 322. The electrically isolated portion 326 may occur at a location on the sensor assembly 204, beyond which unintended detection of the EM field is not expected to occur. According to certain aspects, the second cable segment 322 may be coupled to surveying equipment aboard the vessel 102 (e.g., such as computer 114 and computer readable medium 116). Alternatively, the second cable segment 322 may occur at any location on sensor assembly 204 that is a region where unintended detection of the EM field may occur. According to certain aspects, the EM field source may be included in the second cable segment 322 rather than towed behind the vessel 102 on a separate cable.

In an example implementation, the sensor assembly 204 may be disposed in the body of water below and parallel to the energy source 112. In this implementation, the length of the second cable segment 322 may be radially adjacent to the energy source 112. Alternatively, the second cable segment 322 and the first cable segment 224 are not radially adjacent to the energy source, and the second cable segment 322 is between the energy source 112 and the first cable segment 224.

As used herein, radially adjacent means that a line from an axis of the EM field source cable along an appropriate radius of the EM field source cable would intersect the second cable segment 322.

According to certain aspects, due to the lack of electrically conductive components, the second cable segment 322 may have a lower weight, density, and/or buoyancy than the first cable segment 224. According to certain aspects, materials may be added or removed from first cable segment 224 and/or the second cable segment 322 to compensate for the difference, such that the second cable segment 322 has approximately the same buoyancy as the first cable segment 224. In an example implementation, where the first cable segment 224 has fewer or no electrically conductive wires or components, a high density (non-electrically conductive) material (e.g., a high density gel or foam) may added in order compensate the density to decrease the buoyancy of the second cable segment 322 approximately equal to that of the first cable segment 224. Additionally or alternatively, lower density materials (e.g., low density gel or foam) could be used in the first cable segment 224 in order to increase the buoyancy to approximately equal to that of the second cable segment 322.

According to certain aspects, it may desirable to provide data storage for measurement taken by the EM sensors 106, 108 in the first cable segment 224 and/or to provide electrically power to components of the first cable segment 224, such as the sensors 106, 108. According to certain aspects, although not shown in the figures, the second cable segment 322 may include an optical waveguide (e.g., an optical fiber). The optical waveguide may run, for example, from the vessel 102, along the entire of length of the sensor assembly 204. Alternatively, the optical waveguide may run only the length of the second cable segment 322, or may run only the length of an electrically isolated portion 326 of the second cable segment 322. The optical waveguide may couple to an optical transmitter (not shown) that converts electrical signals to optical signals.

According to certain aspects, energy may be transmitted by the optical waveguide to provide power. In an implementation, energy may be provided by the second cable segment 322 to the first cable segment 224 via the optical waveguide.

According to certain aspects, data from the sensors 106, 108 may be transferred by the optical waveguide. For example, the optical waveguide may send the data to a storage which may be located on the vessel 102 (e.g., computer 114 and computer readable medium 116) or on the sensor assembly 204.

Figure 4:
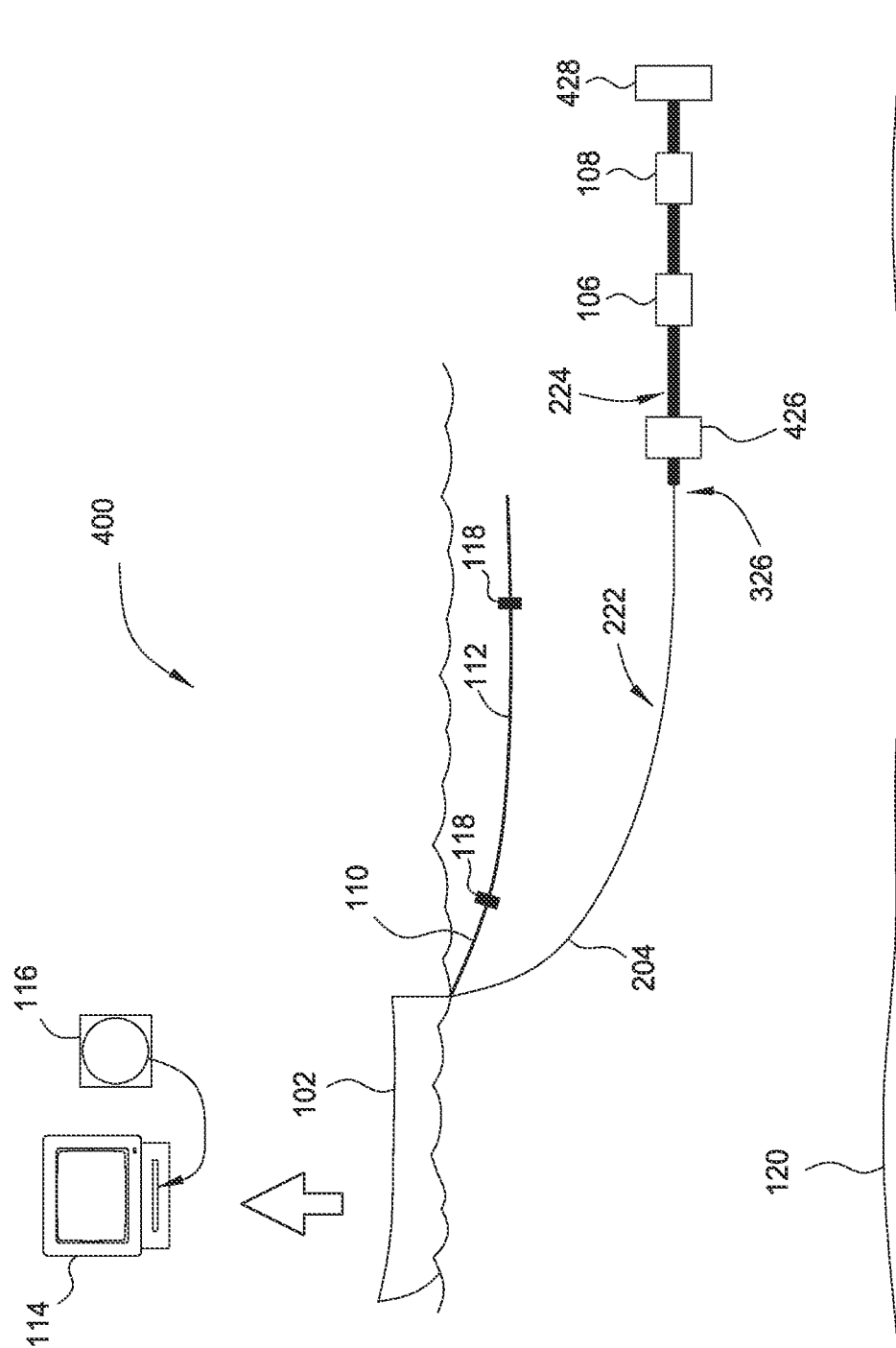
FIG. 4 is an example activity diagram showing a data acquisition scheme in a marine context having a towing configuration with an electrically isolated sensor assembly portion, according to certain aspects of the present disclosure.

According to certain aspects, the first cable segment 224 may include a data storage 426 and a power source 428 as shown in FIG. 4. In this implementation, the first cable segment 224 may be self-contained (i.e., does not receive or transmit any power, data, signal, or other electromagnetic energy to or from the second cable segment 222), and may not communicate directly with the second cable segment 222 or vessel 102. In this case, the second cable segment 222 could simply be any electrically inactive spacer, such as a rope. Although, the entire length of the second cable segment 222 may be electrically inactive, the second cable segment 222 could also include an electrically conductive portion and an electrically isolated portion 326 as shown in the implementation illustrated in FIG. 3. The data storage 426 may be located anywhere along the first cable segment 224. Locating the data storage 426 on the first cable segment 224 may be useful to reduce or avoid including any electrical components in the second cable segment 222.

In an implementation, the power source 428 may be a battery that provides electrical power to the electrical components of the first cable segment 224 which may include, for example, the EM sensors 106, 108 and the data storage 426. In another implementation, the first cable segment 224 may include a power harvester that harvests energy from its surroundings. For example, the power source 428 may be a hydrodynamic generator that includes a propeller and a transducer. The propeller may be coupled to the first cable segment 224, such that as the sensor assembly 204 is towed through the water behind the vessel 102, the propeller may rotate and generate energy that may be converted to electrical energy by the transducer, and then provided to the various electrical components of the first cable segment 224. In another example, the power source 428 may include a motion and vibration generator and a transducer. The motion and vibration generator may be coupled to the first cable segment 224, such that motion of the first cable segment 224 or its surroundings may cause vibrations and the energy from the vibrations may be converted to electrical energy by the transducer, and then provided to the various electrical components of the first cable segments. According to certain aspects, other types of power sources that harvest energy from surroundings may be used (e.g., using a solar power generator or a wind power generator, etc.). According to certain aspects, the power source 428 may be coupled directly to, mounted on, or coupled via extensions to the first cable segment 224. In cases that the power source 224 is coupled indirectly or via extension to the first cable segment 224, the power source 224 may be towed behind the first cable segment 224, or for example, may be buoyed to the surface. In an example implementation, one or more solar panels or wind turbines and a transducer may be buoyed at water level, and the transducer may be electrically coupled to the first cable segment 224.

According to certain aspects, in the towing configurations described above, other types of sensors may be used in addition to the EM sensors 106, 108. For example, seismic sensors may also be used which may also benefit from reduced noise/interference from unintended detection of the EM field.

Figure 5:
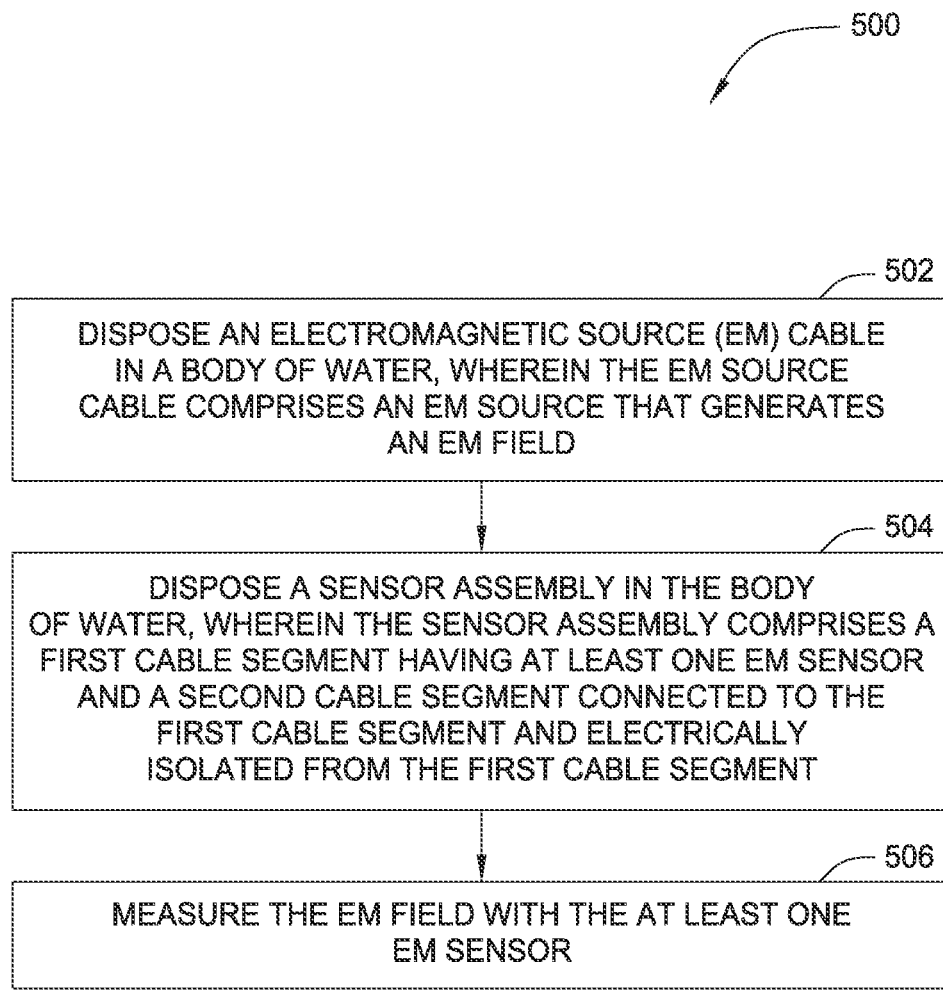
FIG. 5 is a flow diagram summarizing a method of performing a marine geophysical survey, according to certain aspects of the present disclosure.

FIG. 5 is a flow diagram 500 summarizing a method of performing a marine geophysical survey, according to certain aspects of the present disclosure. At 502, an EM field source cable may be disposed in a body of water, wherein the EM field source cable comprises an EM field source that generates an EM field.

At 504, a sensor assembly may be disposed in the body of water, wherein the sensor assembly comprises a first cable segment having at least one EM sensor and a second cable segment connected to the first cable segment and electrically isolated from the first cable segment. For example, the second cable segment may be free of electrically conductive wires and components. Alternatively, the second cable segment may include at least one electrically conductive wire or component, but the at least one electrically conductive wire or component is not electrically connected to the first cable segment or to the at least one EM sensor. The second cable segment may be located in an area where unintended EM pickup may be expected to occur (e.g., near to or under the EM field source). For example, the second cable segment may be coupled to geophysical surveying equipment of a survey vessel. The length of the second cable segment may be equal to greater than the length of the EM field source.

At 504, the EM field may be measured with the at least one EM sensor. According to certain aspects, the first cable segment may also include other types of sensors, such as a seismic sensor. According to certain aspects, the second cable segment may also include at least one optical waveguide that optically couples the second cable segment to the first cable segment. The second cable segment may transfer energy optically to the first cable segment via the at least one optical waveguide. The second cable segment may also transfer data from the at least one EM sensor optically to a data storage (e.g., located on the vessel) via the at least one optical waveguide. Alternatively, the first cable segment may include at least one data storage unit for storing data from the at least one EM sensor. The first cable segment may be electrically coupled with a battery to provide electrical power to electronic components of the first cable segment. Additionally or alternatively, the first cable segment may be configured to harvest energy from its surroundings. For example, the first cable segment may include at least one propeller and transducer for generation of electrical power to provide electrical power to electronic components of the first cable segment.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The aspects and implementations described herein may be useful to reduce or eliminated undesired signal cross-feed from the EM field source to the streamer, which may aid in maintaining data quality over a full frequency range. Isolated streamer sections may reduce susceptibility to EM field source-generated noise in addition to other EM noise sources, such as survey vessel thrusters and/or other survey vessel systems. Isolated streamer front sections may allow for towing of EM field sources and streamers closer to each other by providing reduced transfer of EM disturbances toward the survey vessel through the front section of the streamer.

Although specific aspects have been described above, these aspects are not intended to limit the scope of the present disclosure, even where only a single aspect is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but aspects may provide some, all, or none of such advantages, or may provide other advantages.

While the foregoing is directed to aspects of the present disclosure, other and further aspects of the disclosure may be devised without departing from the basic scope thereof, and the scope thereof is determined by the claims that follow.

What is claimed is:

1. An apparatus for marine geophysical surveying, comprising:
   a first cable segment of a sensor assembly comprising a power supply and a plurality of electronic components including at least one electromagnetic (EM) sensor, wherein the plurality of electronic components are powered by the power supply; and
   a second cable segment of the sensor assembly connected to the first cable segment and electrically isolated from the first cable segment.

2. The apparatus of claim 1, wherein the second cable segment is free of electrically conductive components.

3. The apparatus of claim 1, wherein the second cable segment comprises at least one electrically conductive component.

4. The apparatus of claim 1, wherein the second cable segment comprises at least one electrically conductive component, wherein the at least one electrically conductive component is not electrically connected to the at least one EM sensor.

5. The apparatus of claim 1, wherein the second cable segment is couplable to geophysical surveying equipment of a survey vessel.

6. The apparatus of claim 5, further comprising an EM field source coupleable to the survey vessel, and wherein a length of the second cable segment is equal to or greater than a length of the EM field source.

7. The apparatus of claim 1, wherein the first cable segment further comprises at least one seismic sensor.

8. The apparatus of claim 1, wherein the first cable segment comprises at least one data storage unit communicatively coupled with the at least one EM sensor.

9. The apparatus of claim 1, wherein the power supply comprises a battery, and wherein the first cable segment further comprises an electronic component coupled to the battery.

10. The apparatus of claim 1, wherein the power supply comprises a power harvester and a transducer, wherein the first cable segment further comprises an electronic component, and wherein the transducer couples the power harvester to the electronic component.

11. The apparatus of claim 10, wherein the power harvester comprises at least one of: a hydrodynamic generator, a solar power generator, a wind power generator, a vibration power generator.

12. The apparatus of claim 10, wherein the power harvester comprises a hydrodynamic generator comprising at least one propeller.

13. The apparatus of claim 1, wherein a density of the first cable segment is equal to a density of the second cable segment.

14. The apparatus of claim 1, wherein the second cable segment comprises an EM field source.

15. A marine geophysical survey system, comprising:
   a vessel;
   an electromagnetic (EM) field source operable to be disposed in a body of water, to be coupled to the vessel, and to emit an EM field; and
   a sensor assembly operable to be disposed in the body of water and coupled to the vessel, wherein the sensor assembly comprises:
      a first cable segment comprising a power supply and a plurality of electronic components including at least one sensor, wherein the plurality of electronic components are powered by the power supply; and a second cable segment connected to the first cable segment and electrically isolated from the first cable segment.

16. The marine geophysical survey system of claim 15, wherein a length of the second cable segment is equal to or greater than a length of the EM field source.

17. The marine geophysical survey system of claim 16, wherein the sensor assembly is operable to be disposed in the body of water below and parallel to the EM field source, and wherein, when the sensor assembly and EM field source are disposed in the body of water, at least a portion of the length of the second cable segment is radially adjacent to the EM field source.

18. The marine geophysical survey system of claim 15, wherein the sensor assembly is operable to be disposed in the body of water parallel to the EM field source, and wherein, when the sensor assembly and the EM field source are disposed in the body of water, the second cable segment and the first cable segment are not radially adjacent to the EM field source and the second cable segment is between the EM field source and the first cable segment.

19. A method for performing a marine geophysical survey, comprising:
- disposing an electromagnetic (EM) field source cable in a body of water, wherein the EM field source generates an EM field;
- disposing a sensor assembly in the body of water, wherein the sensor assembly comprises:
  - a first cable segment having a power supply and a plurality of electronic components including at least one EM sensor, and
  - a second cable segment connected to the first cable segment and electrically isolated from the first cable segment;
- supplying power to the plurality of electronic components with the power supply; and
- measuring the EM field with the at least one EM sensor.

* * * * *